May 21, 1957  C. MACKINTOSH  2,792,943
WATER FILTERING APPARATUS
Filed March 23, 1954  2 Sheets-Sheet 2
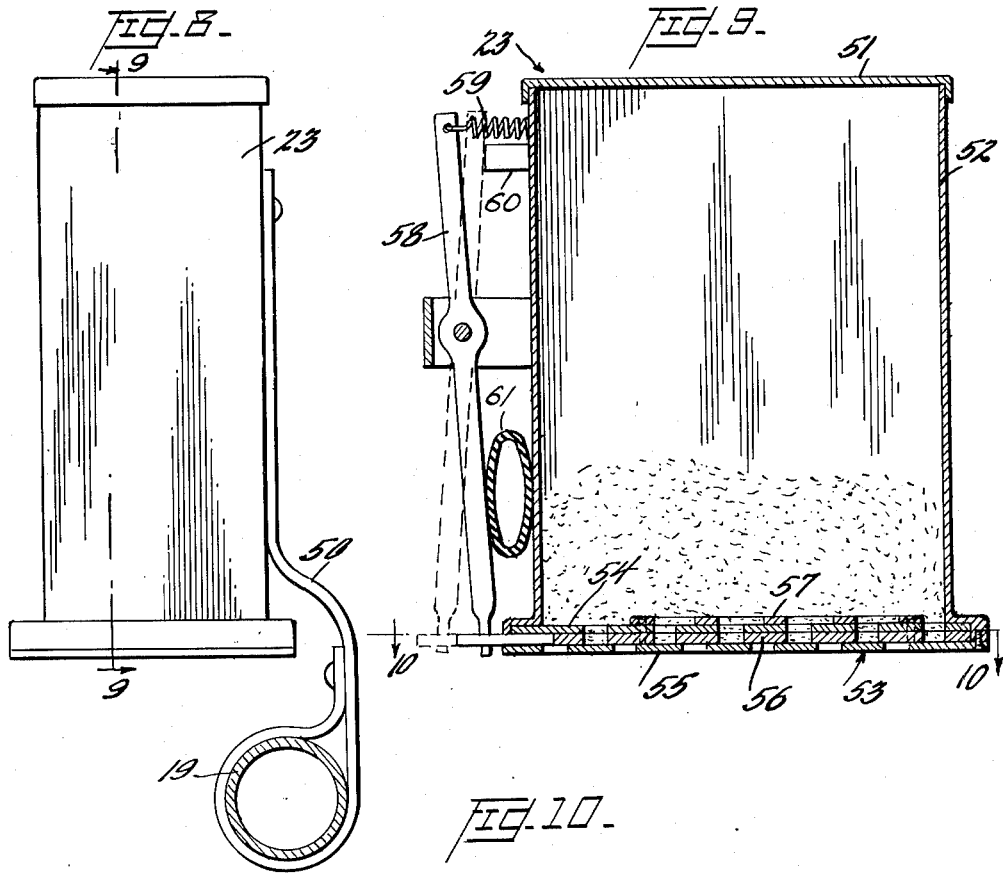
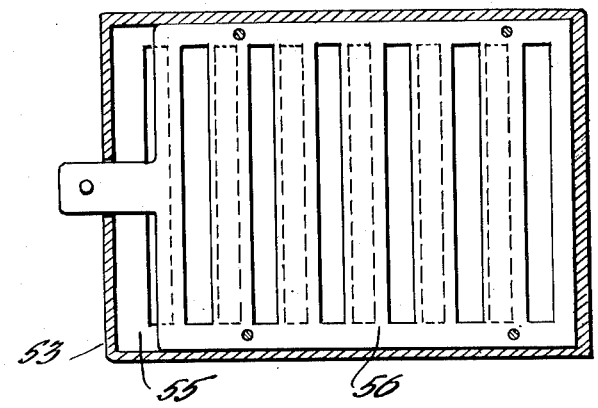
INVENTOR
Charles Mackintosh
BY
Watson, Cole, Grindle, & Watson
ATTORNEYS

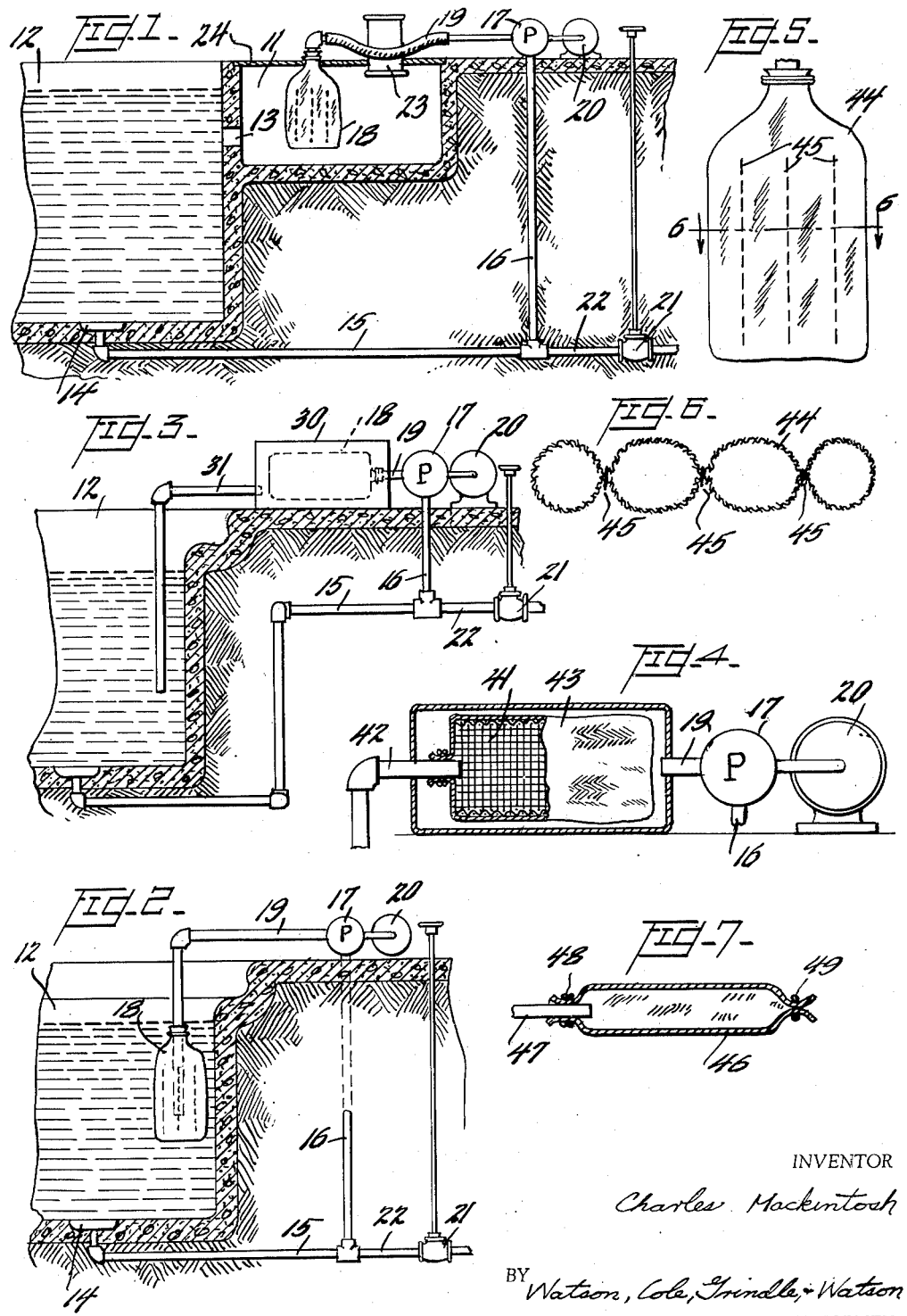

United States Patent Office 2,792,943
Patented May 21, 1957

2,792,943
WATER FILTERING APPARATUS

Charles Mackintosh, Los Angeles, Calif.

Application March 23, 1954, Serial No. 417,997

2 Claims. (Cl. 210—448)

This invention relates to improved methods and apparatus for clarifying and purifying large volumes of water. The principles of this invention are particularly adapted for advantageous use in the filter and purifying systems of swimming pools. From a generic aspect however, they may be employed in many other applications wherein water sanitation and clarification are required.

The maintenance of swimming pool water in a clear and clean condition usually requires that bacteria and small amounts of fine, sometimes slimy or gelatinous suspended matter be removed. Chemical treatment, of course, effectively eliminates bacteria, but clarification presents a somewhat more difficult problem. Sand and diatomite powders have heretofore been employed as filters to clarify swimming pool water. These filter mediums have been relatively expensive for use in small installations inasmuch as they require frequent attendance, backwashing, and a dry well to dispose of the backwash water.

Accordingly, a principal object of this invention is to provide an efficient swimming pool filter system which can be economically installed and maintained with a minimum of attendance. This object is attained herein by a novel arrangement wherein cloth in the form of a bag or the like is utilized as the active filter agent in lieu of sand or diatomite. This mode of filtering does not require a pressure tank or back-washing; and the pump motor for circulating the water through the filter is also substantially reduced in size.

Cloth bags have found common use as filters in both household and industrial vacuum cleaners. Bags made of cloth have also been used in many of the prior art diatomite filter arrangements adapted for swimming pools. In these particular filters, it has been common to establish upon a body of cloth one or more films or cakes varying from $1/10$ to $1/8$ inch thick and composed entirely of diatomite filter powders. In all of these arrangements the diatomite film or cake is utilized as the true filter medium, and the cloth as such is used only to provide a support surface upon which the diatomite films can be established. The bags per se, that is the cloth linings thereof, have never been employed to filter the water directly.

In a preferred embodiment of the filter system of this invention, a canvas bag with at least the inner surface thereof containing nap is utilized to filter the water directly without the aid of any of the sand and diatomite layers of the prior art. In the broadest aspect of the invention, swimming pool water is filtered by circulating water preferably from the bottom of the pool through the filter bag and returning the filtered water into the pool at an upper level. Depending upon the practical requirements of a particular installation, the filter bag might advantageously be installed in the pool itself, or enclosed within a liquid tight container located at the ground level, or positioned within a relatively small auxiliary pool located by the side of the swimming pool.

Another object of this invention is to purify swimming pool water by methods and apparatus which are compatible with the foregoing filter system, and which also effectively eliminate disinfectant sediment deposits in swimming pools.

This object is attained herein in a preferred mode of operation by modifying the filter arrangement employing an auxiliary pool adjacent the swimming pool so that the disinfectant chemical from an automatic chlorinator is deposited directly into the pit. This mode of operation eliminates the chemical sediment usually found in swimming pools, and the use of the cloth filter bag in conjunction with an automatic chlorinator in the foregoing manner effectuates considerable economy in the maintenance of a swimming pool and also provides an arrangement which can operate satisfactorily without an attendant for a month or more at a time.

In order that the principles of this invention may be readily understood reference is herein made to the accompanying drawings wherein:

Figure 1 is a diagrammatic representation of a first species of this invention employing a filter bag positioned within an auxiliary pool;

Figure 2 is a diagrammatic representation of a second species of this invention employing a filter bag positioned within a swimming pool;

Figure 3 is a diagrammatic representation of a third species of this invention employing a filter bag positioned within a tank located at ground level;

Figure 4 shows a filter tank having a filter bag in which water flows from the outside to the inside of the bag;

Figure 5 is a preferred embodiment of a filter bag having optimum filter service;

Figure 6 is a sectional view of the filter bag shown in Figure 5 and taken along line 6—6;

Figure 7 is a sectional view of a cloth filter bag having a clamped end;

Figure 8 is a side elevational view of an automatic chlorinator tank;

Figure 9 is a sectional view of the chlorinator tank shown in Figure 8 and taken along lines 9—9; and Figure 10 is a plan view of the grid structure employed in the chlorinator tank shown in Figures 8 and 9.

In the novel filter arrangement shown in Figure 1, filter bag 18 is positioned within a relatively small auxiliary pool located adjacent swimming pool 12. Bag 18 is preferably made of cotton canvas with a thick nap on the inside such as is commonly used to clean air in air purifying systems. Synthetic cloths having nap on one surface are also satisfactory. Passage 13 is provided in the common wall between pool 11 and swimming pool 12 whereby water transfer may be effectuated from the auxiliary pool to the swimming pool. Pump 17 draws water from the bottom of pool 12 through passage 14, pipe 15 and pipe 16; and pipe 19 transmits the water output from pump 17 into cloth filter bag 18. Motor 20 drives pump 17, and gate valve 21 provides drainage for swimming pool 12 through outlet pipe 22.

The detailed operation of this filter system is as follows: Initially pool 12 is filled with water, and gate valve 21 is closed so that the water may be retained. Thereafter motor 20 is energized and the operation of liquid pump 17 draws water from the bottom of pool 12, through passage 14, pipe 15 and pipe 16, with delivery into bag 18 through pipe 19. The pressurized water within bag 18 filters through the cloth and the resulting pressure outside the bag transmits the clarified water from auxiliary pool 11 to swimming pool 12 through passage 13.

Figure 2 shows an alternative filter system wherein auxiliary pool 11 is eliminated and filter bag 18 is positioned within swimming pool 12. The water circulating system operates in substantially the same manner as that previously described with respect to Figure 1. The arrangement of Figure 2 represents perhaps the most simplified structure for employing a bag for a swimming pool water filter.

Figure 3 shows an alternative filter system wherein filter bag 18 is installed within a container. Container 30 is positioned at the ground level thereby eliminating the need for an auxiliary pool or a direct installation of the bag within the pool. In the preferred use of materials, filter bag 18 is constructed of synthetic cloth, and container 30 is constructed of a fibre glass which is not subject to attack by chlorine. With such a construction a relatively indestructible, small, above-ground filter is provided which can be placed unobtrusively behind the motor and pump. Output water flow from filter bag 18 is transmitted from container 30 into swimming pool 12 through outlet pipe 31.

An alternative arrangement for enclosing a filter bag within a container is shown in Figure 4. The input and output pipe connections to bag 43 are so arranged that water is filtered by water transfer from the outside of the bag to the inside of the bag. Wire frame 41 supports bag 43 and prevents its collapse in response to the application of water on the outside surface.

In this arrangement pump 17 forces the water through pipe 19 into container 40 with a resultant water outflow through outlet pipe 42.

A preferred filter bag construction having a minimum volume requirement and an optimum filter surface is shown in Figures 5 and 6. In this construction the outer walls of bag 44 are sewed together to form a plurality of seams 45, thereby sectionalizing the bag into four compartments as is clearly shown in the sectional view of Figure 6. This arrangement provides a bag which may be installed in a relatively small space.

From a generic aspect, the filter medium which may be used in the systems of this invention can be of any construction wherein water transfer is effectuated through cloth preferably having nap on one surface thereof. For example, it is not necessary that bags have one or more sewed ends. In Figure 7, one end of a cylinder of cloth 46 is clamped to pipe 47 by means of clamp 48. The other end is closed by end clamp 49 whereby water transfer must be directed through the cloth walls of cylinder 46.

The novel filter system of this invention employing an auxiliary pool as shown in Figure 1 may be suitably adapted for the use of automatic chlorination or the like, whereby chemical sediment deposits usually found in swimming pools may be effectively eliminated. In a preferred construction, chlorinator tank 23 is arranged so that the bottom thereof projects through cover 24 for auxiliary pool 11. The chemicals stored within tank 23 are thereby deposited directly into the auxiliary pool, and inasmuch as passage 13 is located several inches above the bottom of the auxiliary pool, the sediment from the deposited chemicals settles therein. Accordingly, only clear filtered water without sediment is transferred to swimming pool 12.

As is shown in Figure 8, tank 23 can be mechanically supported in a proper position relative to the auxiliary pool by clamping bracket 50 to pipe 19. A preferred construction for tank 23 is shown in Figure 9. In this arrangement, cover 51 and tank cylinder 52 enclose the stored chemicals with a resultant deposit occurring through bottom grid structure 53. This grid structure comprises two stationary grids 54 and 55 sandwiching movable grid 56. Upper grid 57 is also coupled to grid 56 whereby the operation of handle 58 to the broken line position compresses spring 59 thereby causing grids 56 and 57 to move to the left with a resulting deposit of the stored chemicals. Grid 57 effectively breaks up any relatively large lumps which might appear in the stored chemicals. Each of the individual grids is preferably formed with a plurality of longitudinal slots as is shown in Figure 10. Stop block 60 and expanding hose 61 define the movement limits for handle 58.

Proper operative timing for tank 23 is provided by coupling handle 58 to motor 20 by conventional means (not shown) whereby at the beginning of each pumping cycle, that is approximately two to four times a day, a measured amount of chemical is deposited into auxiliary pool 11. Inasmuch as the chemical is deposited some distance from filter bag 18, the filter bag is not appreciably affected by the chemicals.

It is to be understood that the above-described arrangements are illustrative of the principles of this invention. Numerous other arrangements may be devised by those skilled in the art without departing from the scope of the invention.

Having thus described the invention, what is claimed as new and desired to be secured by Letters Patent is:

1. A filter for use in purifying the water of a swimming pool, said filter comprising a rigid walled box having oppositely disposed end walls, an outlet pipe passing through one of said end walls for the discharge of filtered water from the box, an inlet conduit passing through the opposite end wall of the box and serving to introduce water from the pool to be filtered, said inlet pipe projecting into the interior of said box a short distance, a filter bag made of canvas with a nap on the inside disposed within said box and having a mouth receiving and detachably secured about the projecting end of said inlet pipe, whereby any solid material filtered out of the water may be caught in the bag and the bag easily removed and replaced, said bag being the sole filtering medium in the filter for said water.

2. A filter for use in purifying the water of a swimming pool, said filter comprising a rigid walled box having oppositely disposed end walls, an outlet pipe passing through one of said end walls for the discharge of filtered water from the box, an inlet conduit passing through a wall of the box and serving to introduce water from the pool to be filtered, said inlet pipe projecting into the interior of said box a short distance, a filter bag made of cloth fabric disposed within said box and having a mouth receiving and detachably secured about the projecting end of said inlet pipe, whereby any solid material filtered out of the water may be caught in the bag and the bag easily removed and replaced, said bag being the sole filtering medium in the filter for said water.

References Cited in the file of this patent

UNITED STATES PATENTS

| | | |
|---|---|---|
| 967,244 | Row | Aug. 16, 1910 |
| 1,190,754 | Hachmann | July 11, 1916 |
| 1,314,957 | Gerhardt | Sept. 2, 1919 |
| 2,097,210 | Davis et al. | Oct. 26, 1937 |
| 2,114,485 | Frolander | Apr. 19, 1938 |
| 2,347,092 | Evans | Apr. 18, 1944 |
| 2,541,799 | White | Feb. 13, 1951 |